INVENTOR.
ROBERT M. BENSON
BY Elliott & Pastoriza
ATTORNEYS

United States Patent Office 3,005,341
Patented Oct. 24, 1961

3,005,341
DIGITAL MASS FLOW METER
Robert M. Benson, 1355 Monument,
Pacific Palisades, Calif.
Filed May 15, 1957, Ser. No. 659,284
5 Claims. (Cl. 73—194)

This invention relates generally to meters for measuring the flow of matter, usually in liquid or gaseous form, in terms of mass flow, and more particularly, to an improved mass flow meter of novel design to provide a read-out signal in digital form for indicating both mass flow rate and the total mass flow.

Many mass flow meters now in operation measure the mass flow rate of fluid in a conduit or path by angularly accelerating the fluid to a uniform velocity of motion about an axis parallel to the flow direction. This angular velocity is imparted by an impeller structure driven at a constant speed of rotation. An axially aligned turbine unit is arranged to intercept the moving fluid and is thereby deflected from a null position to a degree proportional to the momentum of the fluid. The deflection of the turbine is restrained by resilient means and the degree of the deflection serves as an indication of the mass flow rate of the fluid. An excellent description of such type mass flow meters is set forth in U.S. Patent Number 2,714,310 issued August 2, 1955.

The degree of deflection of the turbine unit in these conventional flow meters is generally indicated by an electrical signal which varies in proportion to the deflection and thus to the mass flow rate. As is the case with all measuring devices which produce an analog signal proportional to the quantity to be measured, totalization or more properly integration is not obtainable by a simple direct means. This fact constitutes a disadvantage in certain flow meter applications.

In mass flow meters of the impeller-turbine type, the impeller is necessarily driven at a constant speed in order that the deflection of the turbine depend only on the mass flow rate and not on the rotational speed of the impeller. Therefore, at very high flow rates, there is a relatively heavy load on the driving motor and impeller and a correspondingly heavy load on the restraining means for the turbine, since this latter unit is subject to a relatively large deflection. On the other hand, for relatively low flow rates, while the load on the motor is considerably decreased, the deflection of the turbine is relatively small and thus errors due to friction in the restraining torque mechanism become proportionately larger. Stated differently, the signal to noise ratio for such mass flow meters increases substantially linearly with increasing mass flow rate. For low flow rates, the signal to noise ratio is small indicating that the noise is large relative to the signal, while for high flow rates the signal to noise ratio is large indicating that the signal is large relative to the noise. It would be far more desirable to provide a meter having a high, relatively constant signal to noise ratio over all flow rates. An accurate error prediction could then be made which could not otherwise be obtained without knowing the relative time periods at which the flow rate was low or high.

Aside from conventional friction inaccuracies introduced by the restraining torque means employed in the turbine unit of conventional flow meters, the restraining means itself can introduce inaccuracies. For example, when a spring is employed for restraining the deflection of the turbine, the counter torque exerted by the spring is proportional to the degree of deflection. This relationship is accurate for very small deflections, but for such small deflections, the restraining force is small compared with frictional forces. On the other hand, while those friction forces are negligible for very large deflections, the relationship between restraining force and deflection may not remain linear.

Bearing the above in mind, it is a primary object of the present invention to provide an improved mass flow meter similar to the above described mass flow meters in general construction, but operated in accordance with a novel design principle wherein an output signal is digital in form to enable an accurate flow rate indication to be exhibited by conventional digital electronic equipment as well as to enable the total mass flow to be readily determined.

More particularly, it is an object to provide a mass flow meter of the above type in which the impeller speed is variable and constitutes a measure of the mass flow rate rather than the degree of deflection of the turbine unit whereby a substantially constant signal to noise ratio over a wide range of different flow rates is realized.

Another important object is to provide a mass flow meter in which errors arising in the restraining components for the turbine are substantially eliminated.

Still other objects of this invention are to provide an improved mass flow meter capable of measuring mass flow rates and total mass flow of liquids, gases, vapors, liquid vapors, liquid-gas combinations, solid particles, particles in suspension, and the like, which may be corrosive and which may vary through extremely wide temperature ranges, without subjecting sensitive control components of the device to such fluids or temperatures.

These and many other objects and advantages of the present invention are attained by providing a mass flow meter similar to the conventional impeller-turbine mass flow meters in that an angular momentum is imparted to a fluid stream by means of an impeller. This angular momentum is removed by a turbine. The inertial torque applied to the turbine by absorbing this angular momentum is a function of both the mass flow rate of the fluid and the speed of rotation of the impeller. In the case of conventional meters, the speed of the driving motor and impeller is maintained constant so that the torque required to oppose the inertial torque created by the momentum change of the fluid constitutes a true measure of mass flow rate. In contrast to the conventional mass flow meter, the present invention applies a precisely known and constant reference torque to the turbine so that the turbine is substantially stationary. The speed of rotation of the impeller is then varied to provide an inertial torque at the measuring turbine that will just balance this reference torque. The speed of the impeller then constitutes a measure of the mass flow rate.

In accordance with a preferred embodiment of the present invention, the impeller speed is controlled by a variable speed motor responsive by means of a feedback path to a torque error signal generated by the turbine. This error signal is proportional to the difference between the reference torque and the inertial torque. By this feedback arrangement, the motor speed is thus increased or decreased to increase or decrease correspondingly the inertial torque in a manner to balance the reference torque. When the flow rate is relatively high, the impeller speed is correspondingly decreased such that the resultant torque developed at the turbine will balance the reference torque. On the other hand, when the mass flow rate is low, the impeller speed is caused to increase in order to provide a resultant inertial torque which will properly balance the constant reference torque. The speed of the motor is thus a reciprocal function of the mass flow rate.

Suitable detecting and converting circuits are then employed to convert the reciprocal speed function into a number of pulses which is directly proportional to the mass flow rate. By employing a simple counter circuit, this number of pulses may be counted to indicate the mass flow rate, and by simply totalizing the number of pulses over any given length of time, the total mass flow during that length of time will be indicated.

A better understanding of the present invention will be had by referring to a preferred embodiment thereof as schematically illustrated in the accompanying drawings, in which.

Figure 1:
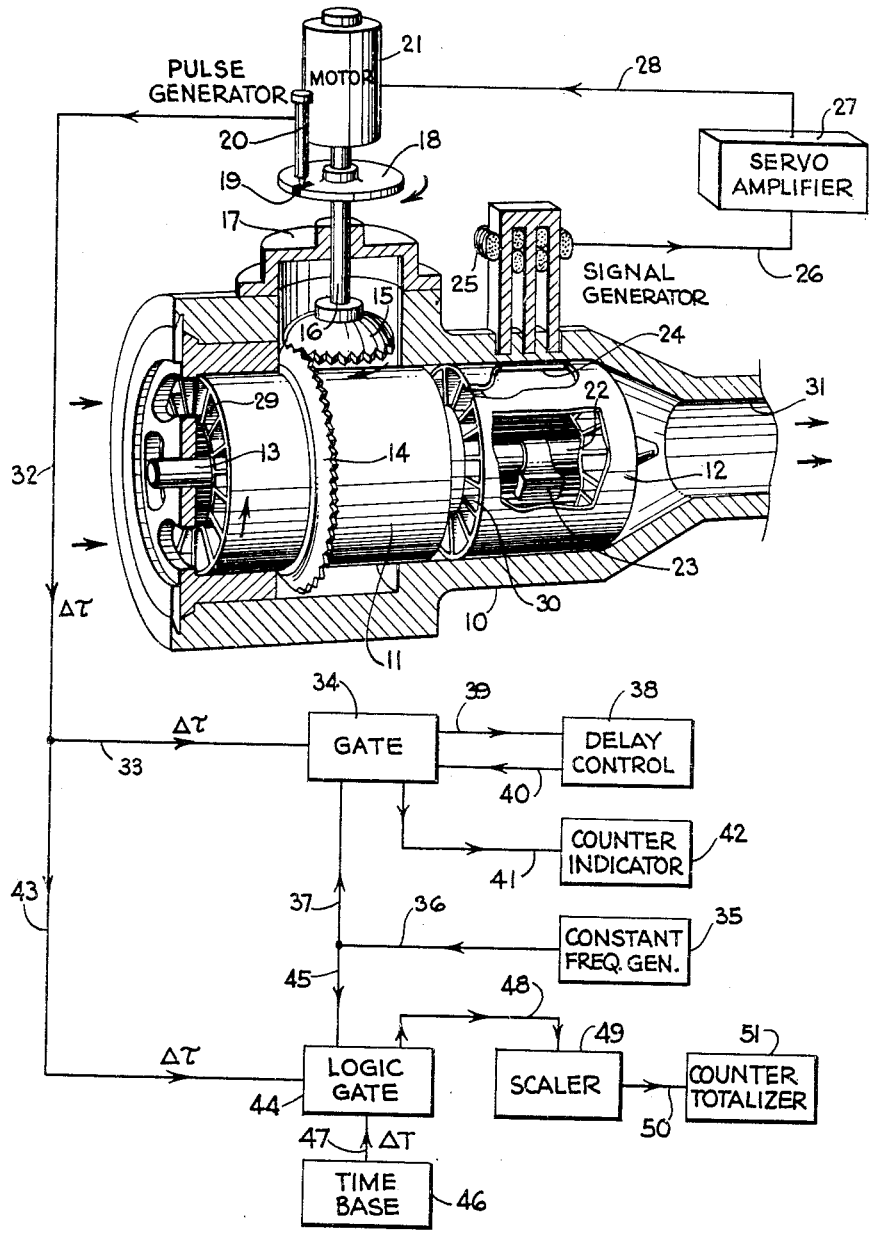
FIGURE 1 is a cutaway perspective view of the improved mass flow meter together with a block diagram of the indicating circuit therefor.

Referring first to the upper portion of FIGURE 1, there is illustrated a mass flow meter, designed in accordance with the present invention, comprising an outer casing 10 incorporating an impeller unit 11 and turbine unit 12. The impeller 11 is rotatably mounted on a shaft 13 and in the embodiment illustrated is arranged to be driven through a ring gear 14 coupled to a driving bevel gear 15. Bevel gear 15 in turn is driven by a shaft 16 passing through a fluid tight housing 17 to the exterior of the casing 10. A pulse generator comprises a disc 18 directly secured to the shaft 16 and includes a pulse generating marker 19 at its peripheral edge. A detecting probe 20 is arranged to provide a pulse each time the marker 19 revolves thereunder. The pulse generator thus supplies an electrical period pulse for each rotation of the shaft 16. Shaft 16 is driven by a variable speed driving motor 21. By this arrangement, the electrical components comprising the driving motor 21 and the pulse generator are wholly exterior of the casing 10 and thus isolated from fluid flow passing through the casing.

The turbine unit 12 is rotatably mounted on a shaft 22 and is provided with a substantially constant reference torque by a cantilevered weight 23 directly secured to the shaft 22. As will become clearer as the description proceeds, the weight 23 applies the reference torque to the turbine 12 in a direction opposite to the inertial torque created by the reaction of fluid passing from the impeller 11 through the turbine 12. Slight rotative or deflection movements of the turbine 12 will arise when the inertial torque is different from the reference torque supplied by the weight 23. These movements are detected in the embodiment illustrated in FIGURE 1 by a member 24 of magnetic material secured directly to the turbine 12 and positioned beneath a magnetic flux carrier supporting a set of flux coupling coils 25. Relative movement between the turbine 12 and casing 10 will thus vary the degree of flux coupling between the member and flux carrier thereby giving rise to a voltage signal in the coils 25 indicative of changes in position of the turbine unit 12. This voltage signal is passed through a lead 26 to a servo-amplifier 27 and thence through output lead 28 to the variable speed motor 21. The speed of rotation of motor 21 may be designed to be substantially proportional to the voltage supplied to it so that an increase in the error signal transmitted through lead 26, servo-amplifier 27, and lead 28, will increase the speed of the motor 21, while a decrease in this signal will decrease the motor speed.

In measuring fluid flow, the meter of FIGURE 1 is positioned in a pipe or conduit carrying the fluid. This fluid will pass into the front of the casing 10 through various channels 29 of the impeller unit 11 and thence through similar channels 30 in the turbine unit 12 to pass out of the exit opening 31.

In operation, the impeller 11 will be driven at a certain speed by the motor 21 through the medium of the shaft 16, bevel gear 15, and ring gear 14. As indicated by the arrow, the direction of rotation is counter-clockwise as viewed from the front. The fluid passing through the impeller will accordingly be angularly accelerated at the time it passes through the channels 29 of the impeller unit 11. Interception of this angularly accelerated fluid by the turbine 12 will give rise to an inertial torque tending to rotate the turbine 12 in a similar counter-clockwise direction. This inertial torque is opposed by the reference torque established by the weight 23 on the shaft 22. Therefore, if the mass flow rate stays constant and the particular impeller speed stays constant, the turbine unit 12 will remain stationary.

If the mass flow rate through the impeller 11 and turbine 12 increases, the angular momentum thereof correspondingly increases to exert a greater inertial torque on the turbine unit 12 thereby tending to rotate the turbine 12 slightly in a counter-clockwise direction. Such rotation will move the magnetic member 24 further away from the flux carrier thereby giving rise to a decreased voltage coupling between the coils 25 and, therefore, a decreased signal passing to the servo-amplifier 27. This decreased signal will result in a decreased amplified signal in the lead 28 to the motor 21 and thus the speed of the motor 21 will be decreased. A decrease in the motor speed results in a decreased rate of rotation for the impeller 11 which will thus decrease the inertial torque applied to the turbine 12 thereby bringing the inertial torque into balance with the reference torque established by the weight 23.

If the rate of mass fluid flow through the impeller 11 and turbine 12 should decrease, the inertial torque intercepted by the turbine unit 12 will decrease resulting in a slight rotation of the turbine unit 12 in a clockwise direction, since the reference torque is now greater than the inertial torque. The arrangement is such that a slight rotation of the turbine unit 12 in a clockwise direction will bring the magnetic member 24 closer to the flux coupling structure for the coupling coils 25 thereby giving rise to an increased signal in the lead 26 and an increased amplified signal in the lead 28 to the motor 21. This increased signal strength thereby increases the speed of the motor 21 and thus that of the impeller 11 to bring the inertial torque back up to a value equal to the reference torque. It is seen accordingly that the operation of the mass flow meter is stable and that the speed of the motor 21 at any given time will serve as an indication of the mass flow rate.

It will be recalled from above that in the event of an increase in mass flow rate, the speed of the motor 21 is decreased whereas for a decrease in mass flow rate the speed of the motor 21 is increased. Therefore, the speed of the motor 21 is actually proportional to the reciprocal of the mass flow rate. The frequency of the period pulses generated by the pulse generators 18, 19, and 20 at each revolution of the motor 21 is, therefore, also inversely related to the mass flow rate. However, the interval of time between these period pulses, that is, the period of rotation of the motor 21, is directly proportional to mass flow rate.

In accordance with an important feature of the present invention, there is provided a converting circuit for delivering in accordance with the period between pulses from the pulse generator, a number of pulses that are directly proportional to the mass flow rate. By employing a simple counter to indicate this number of pulses, a direct indication of mass flow rate may be obtained. To this end, and as shown in FIGURE 1, the period pulses from the pulse generator are passed through a line 32 and branch line 33 to a gating circuit 34. A constant frequency generator 35 continuously provides a fixed number of pulses per unit time which are passed from an output line 36 and branch line 37 to the gating circuit 34. Also connected to the gating circuit 34 is a delay control circuit 38 responsive to the period pulses entering the gating circuit 34 through a line 39 and adapted to affect operation of the gating circuit periodically by means of a return line 40. The output of the gating circuit 34 passes through line 41 to a counter indicator circuit 42.

By the above arrangement, there is provided a converting circuit for converting the period of the motor 21 into a number of pulses proportional to this period which pulses are periodically fed to the counter indicator circuit 42 to provide a direct reading of mass flow rate. As will become clearer as the description proceeds, the period pulses from the input line 33 to the gating circuit 34 co-operate with the delay control circuit 38 to pass a number of fixed pulses from the constant frequency generator 35 proportional to the time interval between any two successive period pulses at periodic intervals under control of the delay control circuit 38. The counter indicator is arranged to count this number of pulses and then reset itself to zero while the delay control circuit holds the gating circuit 34 inoperative. The count indicated on the counter indicator 42 will, therefore, provide a continuous indication of the mass flow rate.

In order to provide an indication of total mass flow over a given period of time, it is only necessary to totalize the number of pulses generated by the constant frequency generator 35 with respect to a constant time base. To this end, the period pulses from the pulse generator are fed through a lower branch line 43 to a logic gate circuit 44. The constant frequency generator 35 also supplies a fixed number of pulses per unit time through the connecting lead 45 to the logic gate 44. The required time base signal may be generated by an accurately controlled crystal oscillator 46 and passed through a lead 47 to the logic gate. The output from the logic gate is passed through a lead 48 to a scaler 49 and thence through an output lead 50 to a counter totalizer 51. As will become clearer as the description proceeds, the time base circuit co-operates with the period pulses to control operation of the logic gate such that only pulses occurring between two successive period pulses will be passed, all other pulses being suppressed that are generated during the same time interval between the time base signals. Accordingly, the counter totalizer 51 will total the number of pulses generated with respect to a fixed time base and thus will provide an indication of the total mass flow over any given interval of time.

Figure 2:
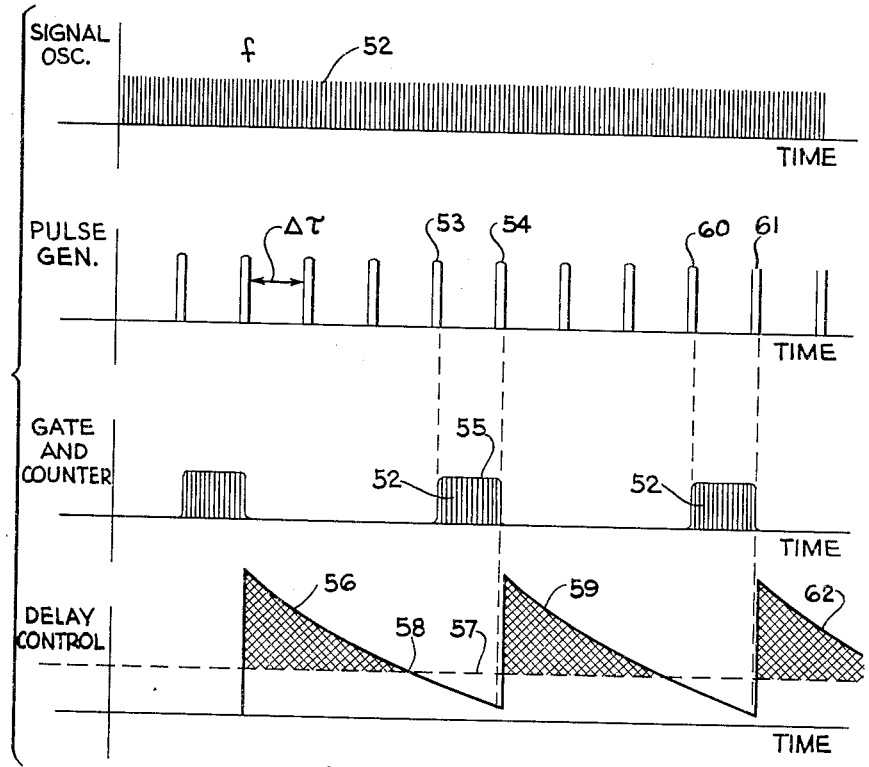
FIGURE 2 illustrates a series of pulses and wave form diagrams useful in explaining the operation of the flow rate indicating circuit of FIGURE 1; and, FIGURE 3 shows two additional pulse diagrams useful in explaining the operation of the totalizing circuit of FIGURE 1.
Figure 3:
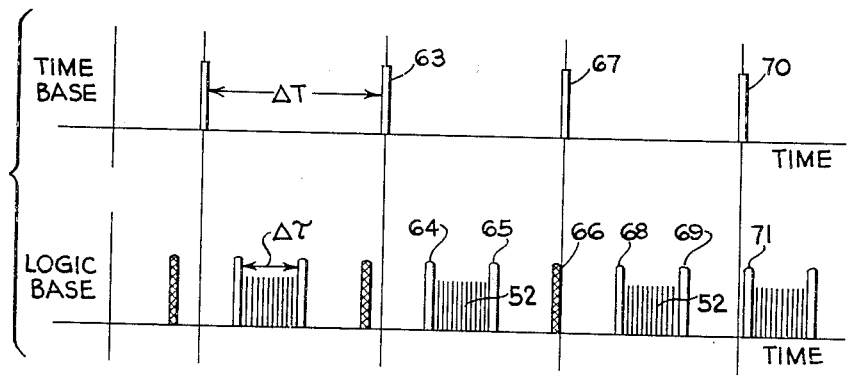

A better understanding of the operation of the flow rate indicator and totalizer circuits will be understood by now referring to FIGURES 2 and 3.

Referring first to FIGURE 2, the top pulse diagram illustrates the output of the constant frequency generator 35 in which a fixed number of pulses 52 are generated per unit time. The frequency of these pulses may be of the order of five kilocycles and this frequency is precisely fixed. The next plot illustrates the output from the pulse generator probe 20 and as shown, these period pulses such as indicated at 53 and 54 are separated by an interval designated $\Delta\tau$. This interval represents the amount of time for one complete rotation of the motor 21 and, therefore, represents the period of the motor. As mentioned heretofore, the speed or frequency of the motor is reciprocally related to the mass flow rate. Therefore, the period or quantity $\Delta\tau$ is directly proportional to the mass flow rate. Thus, if the motor speed decreases, the distance between the period pulses 53 and 54 will increase thereby increasing $\Delta\tau$ whereas if the speed of the motor increases the period pulses 53 and 54 will be closer together thereby decreasing the period $\Delta\tau$.

As mentioned in connection with FIGURE 1, the fixed number of pulses 52 and the period pulses from the pulse generator such as 53 and 54 are both fed to the gating circuit 34. In the third diagram of FIGURE 2, there is illustrated an envelope 55 representing the on and off operation of the gating circuit. In the last diagram of FIGURE 2, there is illustrated a periodic signal 56 generated by the delay control 38 of FIGURE 1 and fed through the lead 40 to the gating circuit 34. The gating circuit 34 is designed to be inoperative if any signal received therein is above a bias level line illustrated in FIGURE 2 by the dashed horizontal line 57. Therefore, the gating circuit is inoperative during the portion of time of the signal 56 that is shaded. After the signal 56 drops below the bias level line 57, as at the cross over point 58, the gating circuit is rendered responsive to any one of the period pulses such as 53.

Thus, as shown in FIGURE 2, the period pulse 53 will open the gating circuit as indicated by the wave envelope 55 to permit a number of the fixed pulses 52 to pass through the gating circuit. The next period pulse 54 will cut off the gating circuit such that the number of pulses 52 passed during the period of the gate 55 will be proportional to $\Delta\tau$, that is, to the interval of time between the successive period pulses 53 and 54. The gating circuit 34 may constitute any well known type of circuit including flipflops or bi-stable circuits which will assume an "on" condition in response to a first pulse to pass signals and an "off" condition in response to a second pulse to block such signals. The interval between the "on" pulse and the "off" pulse constitutes a period when the gate is open.

At the time of the termination of the gate by the period pulse 54, the delay control circuit 38 is also triggered by this pulse 54 to generate the control signal 59. This control circuit may take a variety of forms. For example, it may include a series resistance and condenser which, when charged and discharged will provide an output voltage as indicated by the wave form 59. This control signal will then hold the gating circuit in an off condition until such time passes that the control signal crosses over the bias line 57. To this end, a semi-conductor in the gating circuit can be rendered non-conducting until the voltage on one of its contacts drops below a given level after which it becomes conducting to place the gating circuit in a ready condition. After this cross over, the gating circuit is therefore in a condition to be responsive to the next following period pulse which in FIGURE 2 is indicated at 60. Period pulse 60 thus opens the gate to pass a number of pulses 52 from the constant frequency generator, the gate again being terminated by the next successive period pulse 61. As in the case of the termination period pulse 54, the period pulse 61 will energize the delay control circuit to generate a control signal 62 again operating to render the gating circuit inactive until the signal 62 falls below the bias level 57.

It will be evident, therefore, that the gate will only pass a number of the fixed pulses periodically depending upon the amount of delay introduced by the delay control circuit. This delay is given a time value sufficient to provide time for the counter 42 of FIGURE 1 to display after each gate signal the count information. Thus, counter 42 is arranged to count the number of pulses 52 under the gate envelope 55 of FIGURE 2 while these pulses are being passed by the gate. During the delay period occasioned by the delay signal 59, the counter will reset itself to zero preparatory to counting the next number of pulses 52 under the next gate envelope. After this count is effected, the counter will then reset itself to zero during the period of the delay signal 62, and so forth. There will thus be periodically displayed by the counter 42 a number indicative of the mass flow rate.

Referring now to FIGURE 3, the time base frequency generator 46 of FIGURE 1 is arranged to generate a series of enabling pulses such as the pulse 63 separated by a fixed time base $\Delta T$. The fixed time base $\Delta T$ is precisely held at a constant value and the various enabling pulses such as the pulse 63 are continuously fed to the logic gate circuit 44. As mentioned heretofore, the period pulses from the pulse generator as well as the fixed number of pulses 52 are also fed to the logic gate 44. In this instance, the logic gate, which is similar in operation to the gating circuit, is placed into a readied condition by the enabling pulses from the time base generator 46. When in ready condition such as occasioned by the time base pulse 63, for example, the immediately following period pulse from the pulse generator designated 64 will open the logic gate to pass a number of pulses 52 from the constant frequency generator 35. The next succeeding period pulse 65, as shown in FIGURE 3, terminates operation of the logic gate so that no more pulses 52 can pass therethrough. Thereafter, the logic gate is held in an off condition until the next time base enabling signal is received. Thus, for example, the next period pulse 66 indicated by the shading in the lower diagram of FIGURE 3 has no effect on the logic gate circuit. Immediately thereafter, however, the time base enabling signal 67 is received which again places the logic gate in a ready condition such that the immediately following period pulse 68 will open the gate to pass a number of pulses 52. The next succeeding period pulse 69 will then terminate the gate and render the logic gating circuit inactive until the next time base enabling signal 70 is received. The enabling signal 70 then places the logic gate in a ready condition so that immediately following period pulse 71 will operate the gate to again pass a number of pulses 52.

By the above arrangement, only that number of pulses occurring between two successive period pulses can be passed during any one $\Delta T$ period and no more pulses can be passed. Accordingly, the output from the logic gate constitutes a number of pulses per fixed unit of time determined by $\Delta T$.

In both FIGURES 2 and 3, it will be evident that the number of pulses passed will be proportional to the period $\Delta \tau$. Thus, if the variable time period $\Delta \tau$ at some instance during the flow measuring operation is .1 second corresponding to a given engine speed and thus a given mass flow rate, and the frequency of the constant frequency generator is 5 kilocycles, then the number of pulses passed by the gating circuits during the interval $\Delta \tau$ will be given by $.1 \times 5000 = 500$ pulses. If the mass flow rate increases such that the speed of the motor 21 decreases thereby increasing the period $\Delta \tau$, to a value, for example, of .2 second, then the number of pulses passed during the period $\Delta \tau$ will equal $.2 \times 5000 = 1000$ pulses. There is thus provided a digital output in the form of a number of pulses directly proportional to the mass flow rate. From the logic gate 44 and scaler 49, the total number of pulses fed into the counter 51 over any given period such as three hours will be directly proportional to the total mass flow during this period. The scaler 49 may simply constitute a frequency divider such as a series of decade stages, each stage generating one pulse at its output only after receiving ten pulses at its input. The scaler is desirable so that the counts appearing in the counter will be within readable number ranges. Thus both mass flow rate and total mass flow may be indicated.

Several advantages are inherent in the above described mass flow meter in which a constant reference torque is established on the turbine and a variable speed motor is employed to generate an inertial torque which balances the reference torque. As a consequence of this arrangement, for example, when the mass flow rate is relatively low, the motor 21 and impeller 11 will be operating at a high speed and thus errors introduced by friction and the like will be minimum. On the other hand, when the mass flow rate is relatively high, the motor 21 and impeller 11 will be operating at a slow speed thus relieving the motor of any overloading during high flow rates. The result is that the signal to noise ratio of the mass flow meter of this invention is substantially constant over widely varying flow rates and thus a predictable error for the meter can be readily ascertained.

Further, the use of the dead weight 23 establishes a very accurate reference torque which is substantially independent of temperature changes and the like. On the other hand, if the flow meter is to be used in aircraft or under other dynamic conditions, a calibrated spring may be used for the refernce torque.

Other consequences aside from the improved signal to noise ratio of the present invention, stem from the digital output enabling the flow meter to be used directly with digital electronic computer equipment and the like.

While the preferred embodiment of the invention has been described in connection with an electrical motor for driving the impeller unit 11 and electrical control signals in the feedback circuits, it should be understood that the control of the speed of the motor 21 as well the the motor itself may be accomplished by mechanical or hydraulic servo systems.

Further, magnetic drive couplings may be employed in place of the bevel and ring gear to permit complete physical isolation of the impeller from the driving components. Other equivalent substitutions will readily occur to those skilled in the art. It should also be understood that the interval $\Delta \tau$ does not necessarily have to represent one complete rotation of the motor. Further markers evenly spaced about the periphery of the pulse generating disc 18 could be provided to generate a $\Delta \tau$ value equivalent, for example, to one-fourth the period of the motor. Operation of the electrical indicating system would still be identical in that the number of pulses counted would be determined by multiplying the new $\Delta \tau$ by the frequency of the generator 35 and thus this number of pulses would still be directly proportional to the mass flow rate. The invention is, therefore, not to be thought of as limited to the particular embodiment schematically illustrated and described herein for illustrative purposes only.

What is claimed is:
1. A mass flow meter comprising, in combination: a casing; an impeller rotatably mounted in said casing; a turbine mounted in said casing in fluid coupling relationship to said impeller; a variable speed motor exterior of said casing; coupling means coupling said motor to said impeller for rotating said impeller whereby fluid passing through said impeller and turbine imparts a first torque to said turbine; torque generating means for applying a constant second torque to said turbine in opposition to said first torque, whereby a deviation of the rotative position of said turbine from a given null position in which said first torque is balanced by said second torque, is a function of the difference between said first torque and said second torque; a member of magnetic material secured to a peripheral portion of said turbine; magnetic flux carrier means secured to said casing in flux coupling relationship to said member; flux detecting coils for generating a signal that is a function of changes in the relative positions of said member and said flux carrier means for sensing said deviation of the rotative position of said turbine; a servo amplifier connected between said flux detecting coils and said motor to vary the speed of said motor in accordance with said deviation in a direction to decrease said deviation; and means responsive to the speed of said motor for indicating the mass flow rate of said fluid passing through said impeller and turbine.

2. A mass flow meter comprising, in combination: a casing; an impeller rotatably mounted in said casing; a turbine mounted in said casing in fluid coupling relationship to said impeller; a variable speed motor exterior of said casing; coupling means coupling said motor to said impeller for rotating said impeller whereby fluid passing through said impeller and turbine imparts a first torque to said turbine; torque generating means for applying a constant second torque to said turbine in opposition to said first torque, whereby a deviation of the rotative position of said turbine from a given null position in which said first torque is balanced by said second torque, is a function of the difference between said first torque and said second torque; sensing means for sensing said deviation of the rotative position of said turbine; control means connected to said sensing means and said motor to vary the speed of said motor in accordance with said deviation in a direction to decrease said deviation; and means responsive to said speed of said motor for periodically providing a number of pulses that are directly proportional to the mass flow rate of said fluid passing through said impeller and turbine, the total number of said pulses indicating the mass flow.

3. A mass flow meter providing an output signal in the form of a number of pulses that is directly proportional to the mass flow rate of fluid through said meter, comprising, in combination: an impeller; a turbine in fluid coupling relationship to said impeller; a variable speed motor for rotating said impeller whereby said fluid passing through said impeller and said turbine imparts a first torque to said turbine which is a function of said mass flow rate and the speed of rotation of said impeller; a constant torque generating means for applying a constant torque to said turbine opposing said first torque whereby a deviation of the rotative position of said turbine from a given null position in which said first torque is balanced by said second torque, is a function of the difference between said first torque and said second torque; means connected to said motor to vary the speed thereof in response to said deviation to vary said first torque in a direction to decrease said difference towards zero whereby said speed is a function of said mass flow rate; detecting means for providing period pulses at a rate proportional to the speed of said motor; converting means connected to receive said period pulses for providing said number of pulses; and indicating means responsive to said number of pulses for indicating said mass flow rate.

4. A mass flow meter according to claim 3, in which said detecting means includes an electrical pulse generator coupled to said motor to generate said period pulse for each revolution of said motor, said converting means including: a constant frequency generator supplying a fixed number of pulses per unit time; a gating circuit connected to said pulse generator and said constant frequency generator to receive said period pulse and said fixed number of pulses; delay control means connected to said gating circuit and responsive to said period pulse enabling said gating circuit to pass a number of said fixed number of pulses proportional to the time period between two successive period pulses, said fixed number of pulses comprising said number of pulses directly proportional to the mass flow rate of fluid through said meter, said indicating means comprising a counter means connected to the output of said gating circuit to count said number of pulses.

5. A mass flow meter according to claim 3, in which said detecting means includes an electrical pulse generator coupled to said meter to generate said period pulse for each revolution of said motor; said converting means including: a constant frequency generator supplying a fixed number of pulses per unit time; a logic gate circuit connected to said pulse generator and said constant frequency generator to receive said period pulse and said fixed number of pulses; a time base generator connected to said logic gate circuit for passing at fixed time intervals an enabling signal to energize said logic gate circuit to pass a number of said fixed number of pulses proportional to the time period between the first period pulse received after reception of said enabling signal and the next successive period pulse, said logic gate circuit then being de-energized so that no more pulses are passed until the next enabling signal is received and the period pulse immediately following said next enabling signal; pulses passed by said logic gate circuit constituting said number of pulses that is directly proportional to the mass flow rate of fluid through said meter, said indicating means comprising a totalizing counter circuit connected to the output of said logic gate circuit.

References Cited in the file of this patent

UNITED STATES PATENTS

| 2,602,330 | Kollsman | July 8, 1952 |
| 2,660,886 | Milmore | Dec. 1, 1953 |
| 2,714,310 | Jennings | Aug. 2, 1955 |
| 2,798,156 | Selmer | July 2, 1957 |
| 2,802,104 | White | Aug. 6, 1957 |
| 2,832,218 | White | Apr. 29, 1958 |

FOREIGN PATENTS

| 734,992 | Great Britain | Aug. 10, 1955 |